United States Patent
Henry

[11] 3,861,212
[45] Jan. 21, 1975

[54] APPARATUS FOR CONTINUOUSLY MONITORING STANDING WATER ON AIRCRAFT RUNWAYS

[76] Inventor: Richard D. Henry, Hookstown Grade Rd., R.D. No. 1, Clinton, Pa.

[22] Filed: June 9, 1972

[21] Appl. No.: 261,198

[52] U.S. Cl.............................. 73/304 R, 73/171
[51] Int. Cl............................................ G01f 23/00
[58] Field of Search........................... 73/304 R, 326

[56] References Cited
UNITED STATES PATENTS

| | | | |
|---|---|---|---|
| 809,542 | 1/1906 | Torst................................. | 73/304 R |
| 1,127,084 | 2/1915 | Ogilvie et al...................... | 73/304 R |
| 2,869,368 | 1/1959 | Brown............................... | 73/304 R |
| 3,186,224 | 6/1965 | Mair.................................. | 73/304 R |

Primary Examiner—Richard C. Queisser
Assistant Examiner—Daniel M. Yasich
Attorney, Agent, or Firm—John A. Young

[57] ABSTRACT

At the sides of the runway and between the sides of the runway at locations where water can collect in standing pools, such water is continuously measured in two different manners. Between the sides of the runway there is a monitoring member which provides an electrical signal in accordance with the depth of standing water on the runway. A series of spaced electrode sensors which are calibrated in spaced-apart relation to each other provide signal outputs directly related to water depth. At the sides of the runway are a second series of electrode sensors which are spaced by graduated vertical distances to measure the depth of standing water at the sides of the runways. The signals from all these sensors are then communicated to a display device which provides a visual readout of the depth and location of standing water on the runway, which information can then be communicated to pilots of aircraft prior to landing or taking off. Information of standing water is essential to the safe operation of aircraft since excessive standing water on runways can cause a drowning out of the aircraft jet engines or cause dangerous sliding and skidding of the aircraft on the runway. The sensor signals are transmitted for example, through the runway light system, and a multiplexing device then conveys the signals to a display for visual readout of the water depth-and-location information.

7 Claims, 17 Drawing Figures

PATENTED JAN 21 1975

APPARATUS FOR CONTINUOUSLY MONITORING STANDING WATER ON AIRCRAFT RUNWAYS

BACKGROUND OF THE INVENTION

There is a definite hazard in having standing pools of water on runways for aircraft during landing and takeoff. Such standing water presents a hazard in that sprays of water developed by aircraft moving through the pools of water can drench the jet engines causing them to flameout. If flameout occurs during takeoff or landing, the aircraft will lack the necessary power either to abort landing or to make a successful takeoff.

Standing water on a runway is objectionable also, because it can cause hydroplaning of the tires, a condition which is caused by a slight film of water which develops between the tire and the runway making it difficult to control the movement of the aircraft and to effect stopping of the aircraft or reduction of speed to taxiing speed within an acceptable stopping distance on the runway.

Unfortunately, there is not available at the present time an effective and reliable means for providing information as to the occurrence, depth and location of standing water on runways short of actual physical measurements by personnel at the time that a request is made for such information by flying personnel. This means, that in the event that there is a rain, thaw, etc., and weather conditions are bad, either a guess must be taken as to runway water conditions or else the pilots making landings and takeoffs must proceed without having such information available to them.

OBJECTS OF THE INVENTION

It is a principal object of the present invention to provide both apparatus and process for indicating the location and depth of standing water on runways, which information is readily displayed to a ground controller and communicated to pilots to assist in selecting a runway or to advise whether runways are in safe condition for use.

A further object of the present invention is to provide a method for continuously monitoring the location and depth of standing water on runways by a unique monitoring system which continuously and accurately locates and provides information of water depth either at selected locations on the runway or throughout the entirety of the runway.

A further object of the present invention is to provide a unique multiplexing system whereby electrical signals which are related to location and depth of standing water on runways, are communicated through existing electrical systems, such as the runway light system, and are transferred through such existing electrical systems to a display which provides a visual readout of standing water on the runway in order that such information can be conveyed to pilots of landing and departing aircraft.

An overall object of the present invention is to contribute to the safety of aircraft operations by making available continuous and accurate information concerning runway conditions and specifically, runway conditions relating to standing water, depth and location whereby hazards such standing water presents are obviated.

Other objects and features of the present invention will become apparent from a consideration of the following description which proceeds with reference to the accompanying drawings.

DETAILED DESCRIPTION OF THE INVENTION

Figures 1, 2:
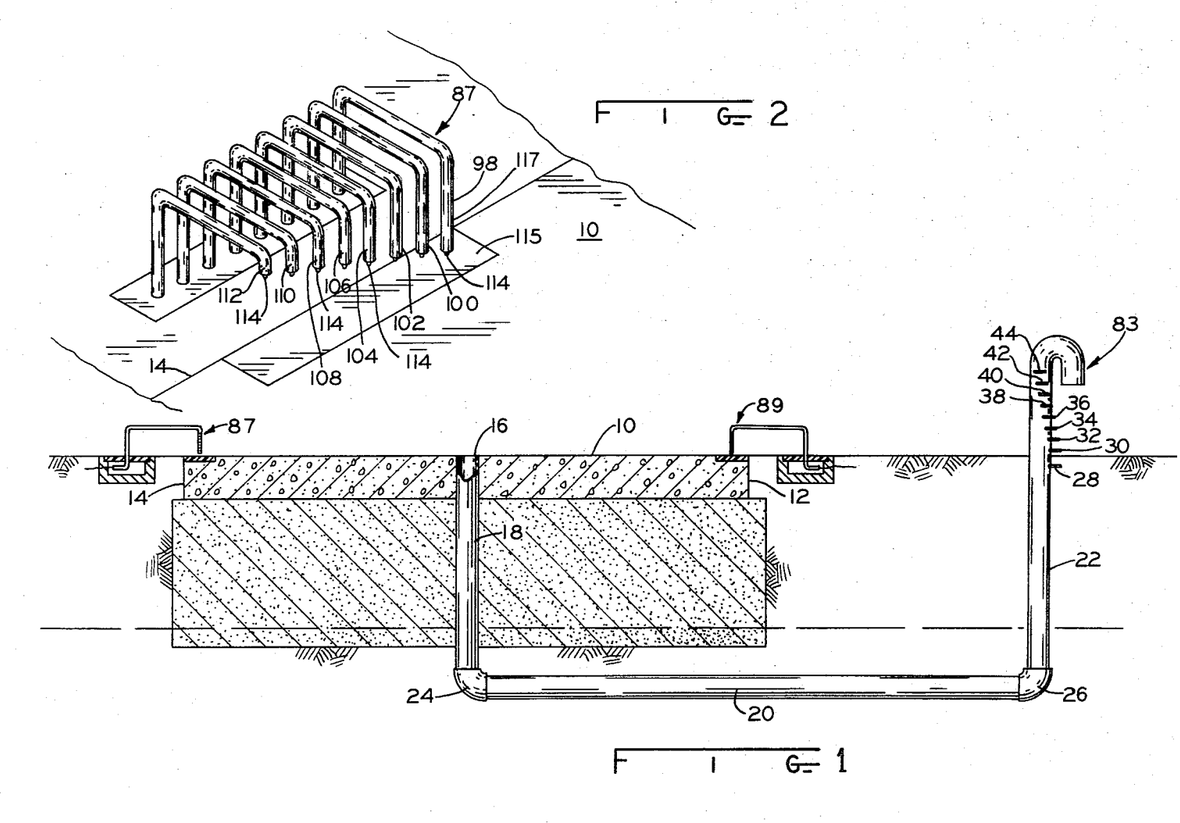
FIG. 1 is a sectional view of the runway, showing the runway together with sensing elements of the present invention disposed between the sides and at the opposite sides respectively of the runway.
FIG. 2 is an isometric detail view of the sensing elements which detect water at the side of the runway.

Referring now to the drawings, a paved runway 10 has, between its sides 12 and 14, an opening 16 in a vertical conduit 18 connected with a lateral conduit 20 and a vertical conduit section 22 at the side of the runway 10. Conduit sections 18 and 22 are connected with transverse conduit 20 by elbows 24 and 26. Within conduit section 22 are a plurality of electrical sensing elements or electrodes 28, 30, 32, 34, 36, 38, 40, 42 and 44 so that as water is conduit 22 attains the same level as the level of standing water on the runway, the electrodes 28–44 indicate the depth of standing water overlying opening 16 on the runway. The depth of water overlying opening 16 is matched by the corresponding water height above ground level within conduit 22, and depending upon water height in conduit 22, one or the other of the calibrated electrodes 28–44 will be contacted by the water to make an electrical circuit.

Figure 3:
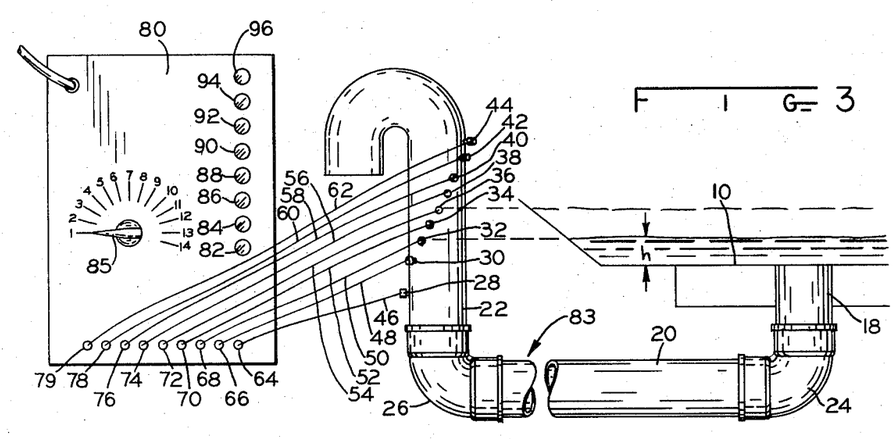
FIG. 3 is an enlarged detail view illustrating the sensing device which monitors water conditions between the side of the runway and a display by which information as to the extent of standing water is made visual.
Figures 4, 17:
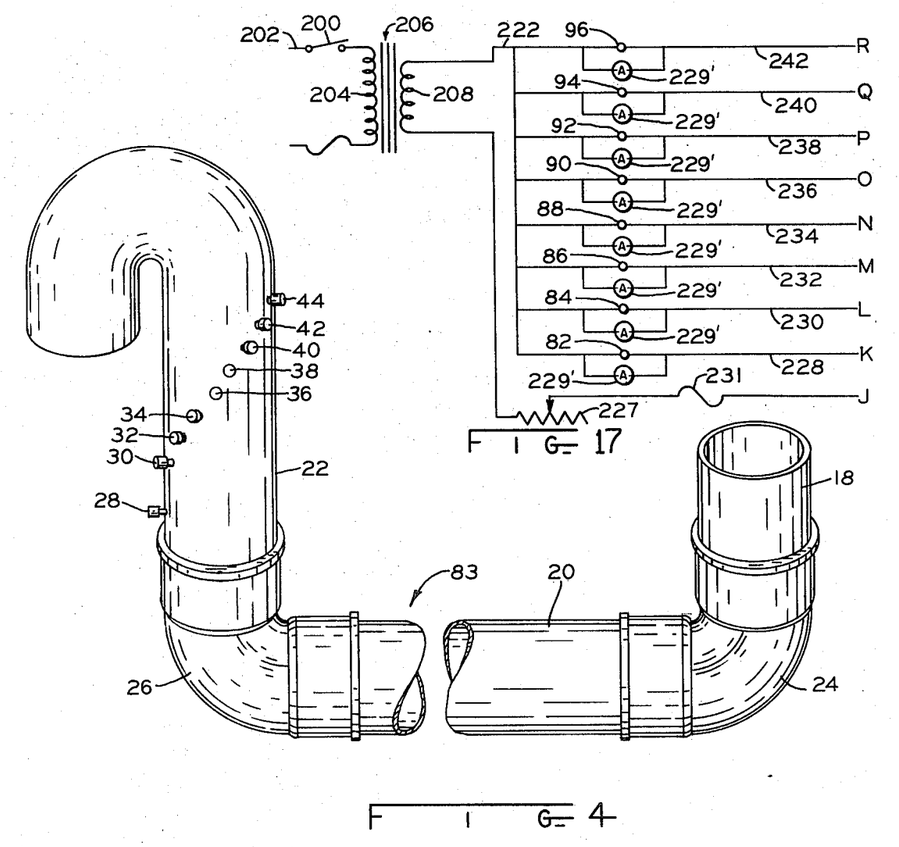
FIG. 4 is an enlarged isometric view of the sensing element illustrated in FIG. 3.
FIGS. 5 and 17 illustrate the electrical circuit for connecting the sensing elements to the display.

The electrodes 28–44 are spaced in conduit 22 in a helical pattern as indicated in FIGS. 3 and 4 and the relative spacing of the electrodes in conduit 22 is calibrated so that depending upon the water level, the particular electrodes which are immersed and hence activated by the water, will provide a direct indication of water level. For example, referring to FIG. 3, a water level on the runway of a height "h" will immerse electrodes 28, 30 and 32 and since the electrodes are spaced one-eighth of an inch apart, this indicates that there is one-eighth of an inch of standing water above the runway 10.

Each electrode is electrically connected by conductors 46, 48, 50, 52, 54, 56, 58, 60 and 62 to electrical contacts 64-79 of a display control box panel 80 having lights 82, 84, 86, 88, 90, 92, 94 and 96, such lights including conduits K-R electrically connected to the electrical contacts 66-79 so that each electrode 28-44 is connected first through one of the contacts 64-79 (FIG. 3) and next through the conductors K-R as indicated in FIG. 17. From comparing FIG. 3 and 17 the electrodes 28-44 are first connected to the contacts 64-74 and the contacts in turn are connected to the respective lights so that the lights in turn are illuminated and the water height is determined as the height $h$ in FIG. 3. The first light 82, is a calibration light which is responsive to electrodes 28 and 30 indicating that there is sufficient water in conduit 18 to provide an accurate readout and with a height of water "h" corresponding to one-eighth of an inch, lights 82, 84, will be lit each light above light 82 representing ⅛ inch standing water on the runway 10.

Figure 8:
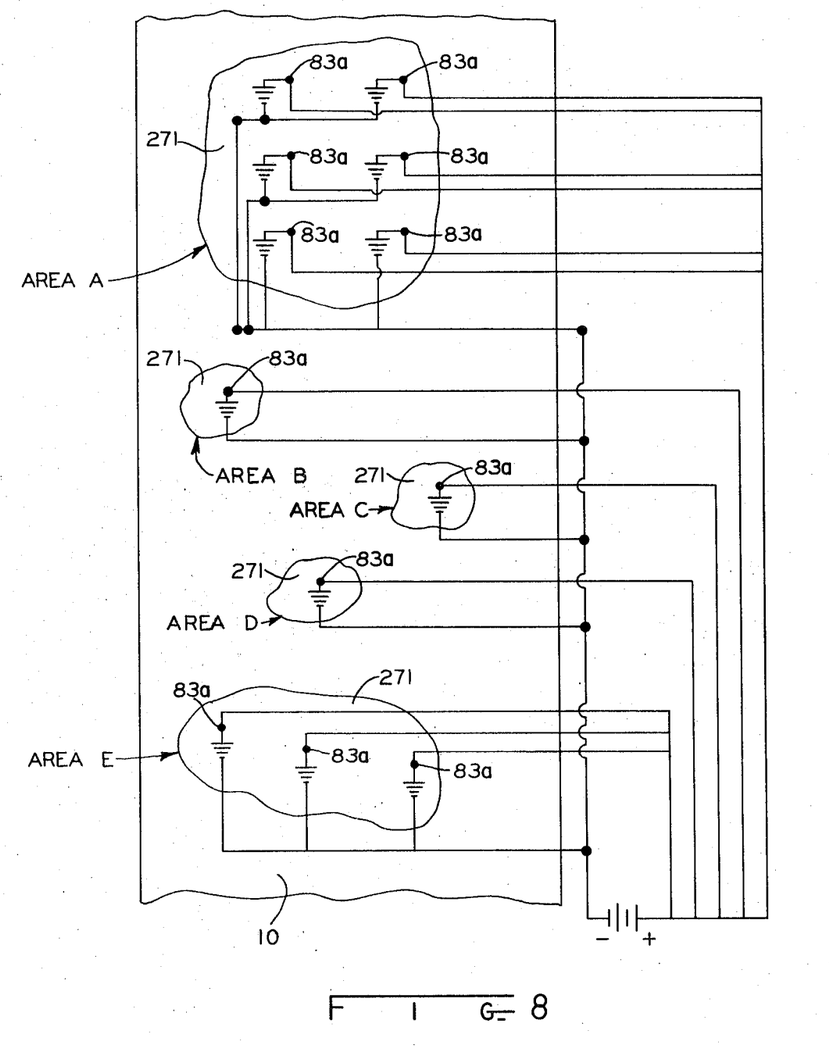
FIG. 8 is a circuit diagram illustrating sensors connected in parallel and disposed at various locations of the runway.

There can be a number of sampling points on the runway 10 having openings 16 (FIGS. 1, 8) and a sensing device, indicated generally by reference numeral 83a (FIG. 8) is duplicated at selected locations on the runway 10 preferably along those low spots which are prone to collect water to a greater extent that the other portions of the runway. However, the invention also contemplates a grid sampling of the entire runway 10 as well as selective testing at only those portions of the runway which are most prone to receive and retain surface water as indicated in FIG. 8.

The same control or display box 80 (FIG. 3) is adapted for providing information of standing water for any one of various sensing devices 83 by means of selector switch 85 which can be switched between positions 1 to 14 indicating 14 different locations on the runway and, depending upon the light display, information can be obtained as to standing water at any one of the 1-14 locations by simply operating the switch 85.

At the sides of the runway 12 and 14 are a second set of sensors designated by reference numerals 87 and 89. The sensor elements at the sides 12, 14 of the runways are identical and only one set of these sensor elements will be described in relation to FIGS. 1 and 2. As indicated in FIG. 2, at the side 12 of runway 10 are a plurality of electrode sensing elements 98-112 which consist of electrical conductors 114 having insulation coating 117 which provides only for exposure of the ends of the conductors spaced at calibrated amounts above the level of runway 10 having a low dielectric plate 115 embedded on the runway 10, such spacing being at ⅛ inch vertical increments above the level of the runway commencing with electrical sensor 98. Therefore, standing water on the runway at the side 12 of the runway 10 (FIG. 2) in the amount of one-eighth of an inch will energize electrode sensor 100, two-eighths inches will activate sensor 102 and so forth. Depending upon the polarity of the probes, circuits are established which complete circuits between the probes or with other portions of the circuit.

Each of the sensors 98-112 is electrically connected to a display 270 or 286 (FIGS. 9, 10) or a readout of the type shown in FIG. 3. In the same manner the sensors located between the sides of the runway are connected to display 270 or 286. Standing water on the runway is therefore sensed both at the sides 12, 14 and between the sides of the runway 10. The sensing devices 83, 87, 89 are connected to a display which "reads out" or provides information as to standing water at selected locations of the runway.

Figure 5:
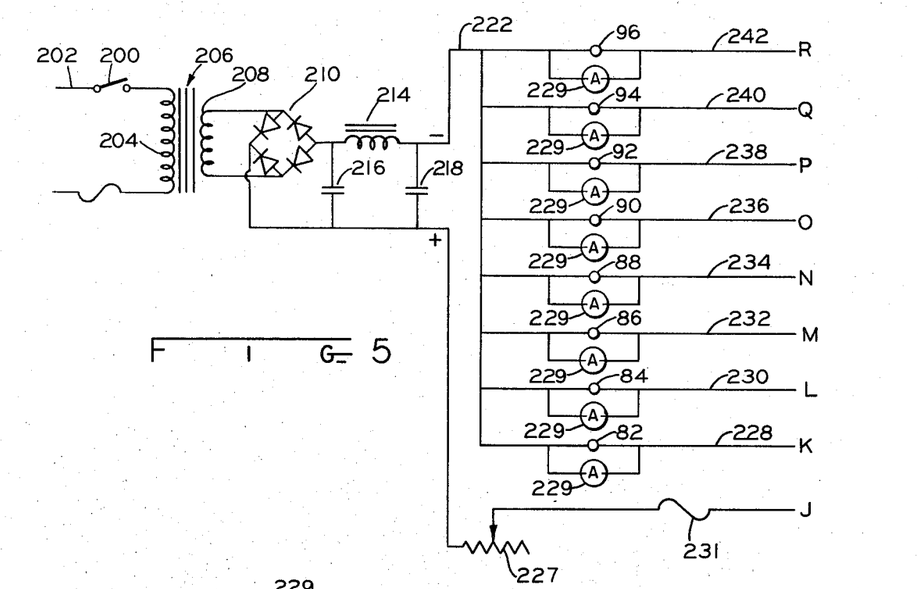

Referring next to the circuit diagram of FIGS. 5 and 17, by which electrical signals are communicated to the display, a switch 200 in power line 202 having 115 volts AC current is applied to the primary coils 204 of a transformer 206, and a lower voltage is then applied from a secondary winding 208 to a rectifier bridge 210. A pulsating DC current from the rectifier bridge 210 is then applied through a choke 214 connected in parallel with a first condenser 216, and a second condenser 218.

It will be understood that the transformer 206 could be either step up or step down or isolation type depending on the desired voltage requirement of the particular readout device chosen.

A current is then applied through conductor 222 connected to light emitting diodes which form display lights 82-96.

The display lights 82-96 may also be in the form of neon lights, liquid crystals, light emitting diodes, opto hybrid readers, national readout tubes, numitron digital display, digivac S/G vacuum fluorescent, electroilluminescent display, and MS Mosaic readouts. These display readouts are mentioned by way of illustration and not limitation. The circuitry may further include a rheostat 227 to control the intensity of illumination and a fuse 231. An ammeter 229 is connected in parallel with each light emitting diode to provide alternate current flow path in event the light emitting diode burns out. The rheostat 227 controls the illumination intensity and fuse 231 protects the circuit. Conductors 228-242 are connected to the respective probes or sensors and gang switching (not shown) is employed to connect the conductors 228-242 to whichever group of sensors is selected including not only the edge and mid location sensors but other sensors along the length of the runway.

Figure 6:
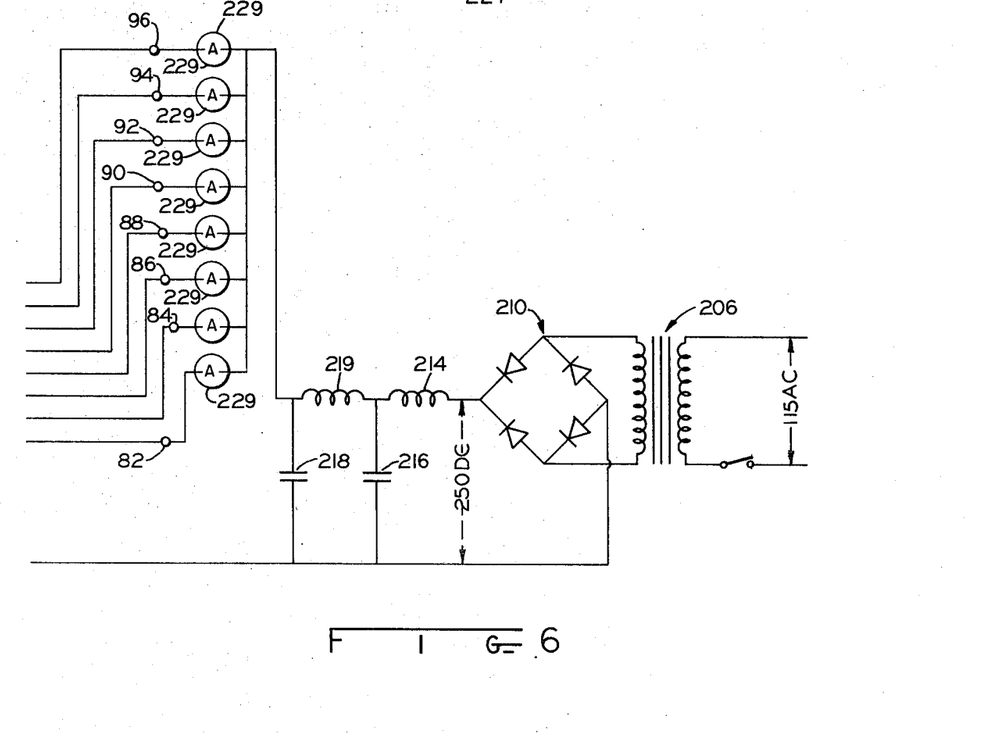
FIG. 6 represents a further diagram indicating how the sensor and indicator means are connectable for providing a remote readout of water conditions on a runway.

Referring next to FIG. 6, the transformer 206 and rectifier 210 are the same but the choke circuits are modified from FIG. 5 so that there are two choke-and-condenser combination 214-216 and 218-219. The readout members, such as light emitting diodes 96 are in series with ammeter 229 and conductors 228-242 are connected with the appropriate sensors as in the previous embodiment. In this embodiment as well as the embodiment of FIG. 5 the output from the filter network is a smooth direct current fed into the indicating system and is in the order of 5-100 millimeters.

Figure 7:
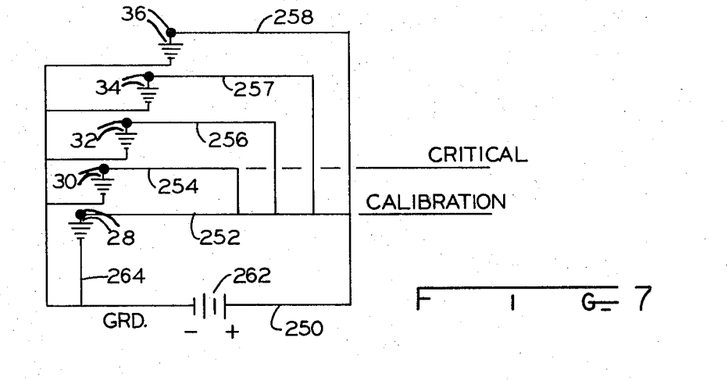
FIG. 7 is a circuit diagram showing how the elements are connected in parallel.

As shown in FIG. 7, the circuitry of the sensor elements 28-36 (only 5 of the 9 sensor elements of FIG. 1 being shown) are arranged so that the sensor elements are connected in parallel through conductors 250, 252, 254, 256, 257 and 258 to a voltae source 262, the circuit then being completed through a ground line 264. It will be noted that the ground 264 is common to each of the sensor elements 28-36.

Referring next to FIG. 8, the collecting points of openings 16 for sensor elements 83 (FIG. 1) are spaceable intermittently at selected locations of runway 10 to be located in those areas which are most prone to contain overlying pools of water 271 or the collecting points for sensors 83 can be regularly spaced throughout all portions of the runway 10.

Figure 9:
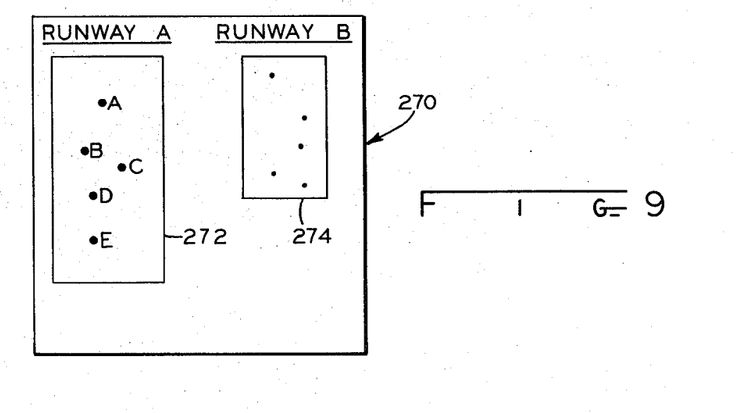
FIG. 9 illustrates the display panel representing the runway and the display elements.

Referring next to FIG. 9, display 270 has two pictorial representations 272 and 274 illustrating runway A and B, respectively. As indicated in FIG. 9 display 272 and 274 of runway A has a display at locations A, B, C, D and E corresponding to collection points of FIG. 8 indicating by location and color of light, on display 270 the depth of water at that particular location. The display devices include in addition to the display 80 of FIG. 3, a color-responsive readout illustrating in red, orange and white acceptable, marginal and prohibitive levels of water at the particular location on the display, in this case, runway A, display 272, FIG. 9 or display 274, runway B.

Figure 10:
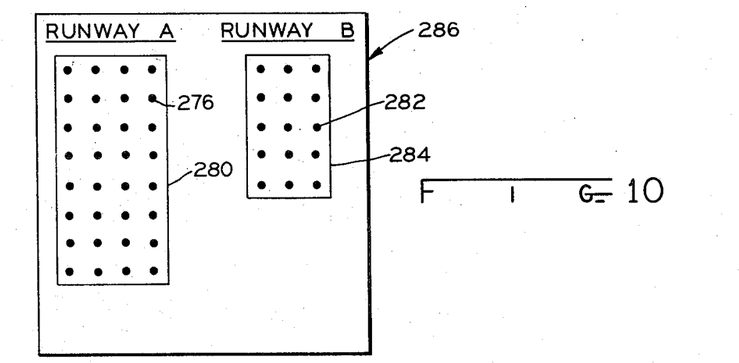
FIG. 10 illustrates an alternate display showing a grid sensor display.

As indicated in FIG. 10, the runway can further include a grid network in which the locations of standing water and depth can be readout at any one of the locations 276 of display 280 for runway A and at locations 282 of display 284 for runway B on the panel 286. In this way, representative samples can be had at each of the different locations, and thus the entirety of the runway is monitored concerning location and depth of water on the runway.

The readout panel is a display which shows the runways to scale. The display lights may either be color coded to signify in red-excess water, orange-marginal water conditions and white indicates a water clear condition of the runway.

Alternatively the lights can be a numeric readout to give a direct reading of the quantity of standing water on the particular section of the runway being monitored.

Figure 11:
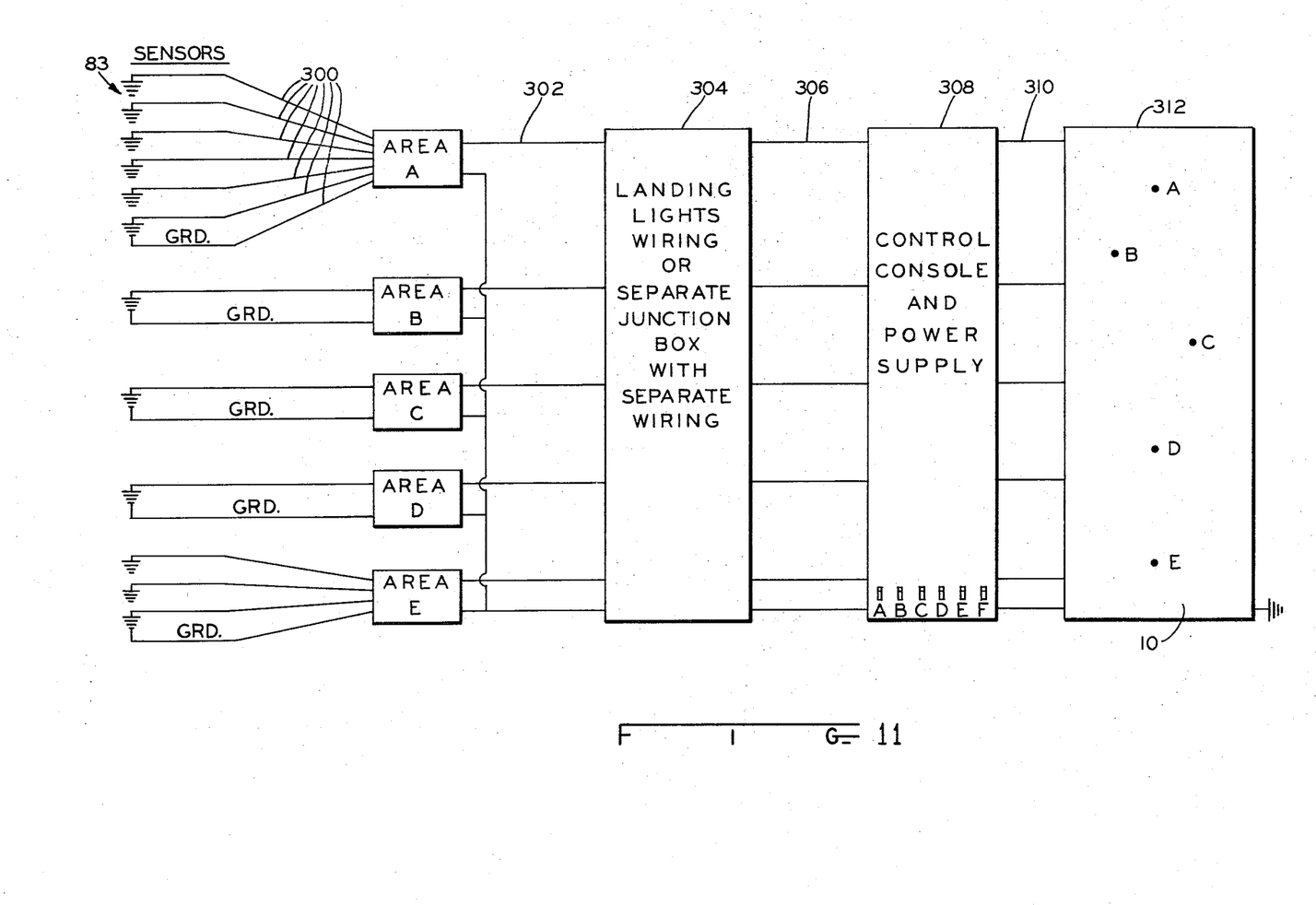
FIG. 11 is a system block diagram illustrating the connection between the sensors and display.

Referring next to FIG. 11, the sensors designated generally by reference numeral 83 and located in areas A, B, C, D and E as indicated in FIG. 8 are each electrically connected by conductors 300 at the respective areas so that the electrical signals from the sensors are transmitted from conductors 300 and 302 either to the landing lights wiring system 304 or to a separate junction box with separate wiring. From there the electrical signals are transmitted through conductors 306 to a control console and power supply 308 and the output is then transmitted through conductors 310 to a console 312 which provides a display of water conditions at regions A, B, C, D and E of a display console 312 having areas A-E corresponding to the areas A-E of an illuminated replica of the runway 10 (FIG. 8) which is presented on the display console 312, to provide a continuous readout of the occurrence and depth of standing water at the respective locations A-E.

Once again, the sensors 83 can either be located only in those regions where there is likelihood to be standing water as for example low areas of the runway, in the areas A-E or the sensors can be regularly located over the entirety of the runway both at the sides and between the sides of the runway 10 in which case the console 312 will monitor the entirety of the runway.

Figure 12:
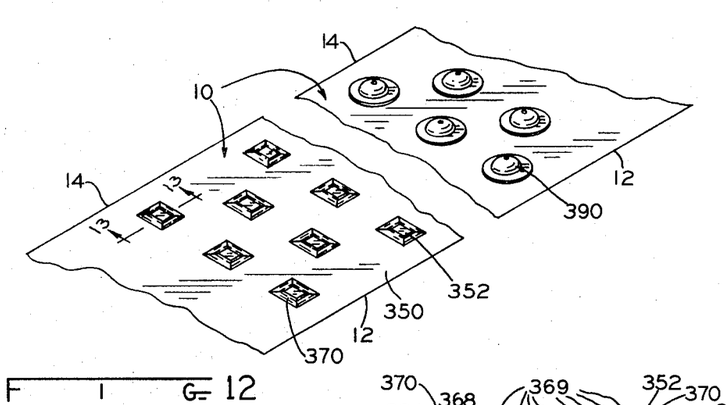
FIG. 12 illustrates further embodiments of the invention wherein the sensors are located above the runway surface.
Figure 13:
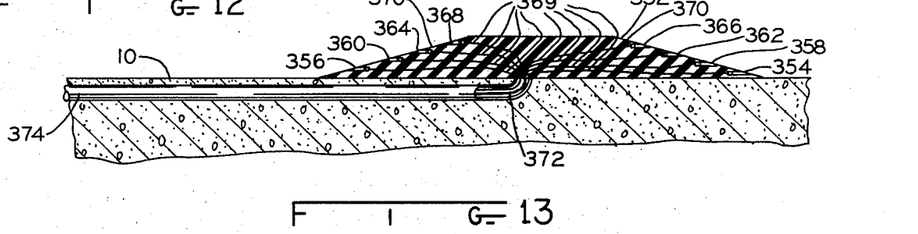
FIG. 13 is an enlarged sectional detail view taken on line 13—13 of FIG. 12.

Referring next to the embodiment shown in FIGS. 12 and 13, monitoring may occur not only in the manner indicated by the arrangement of FIGS. 3 and 4 but devices can be located on the surface 350 of runway 10 by means of a hard rubber or plastic blocks 352 in which electrodes 354, 356, 358, 360, 362, 364, 366 and 368 are located at various elevations above the surface 350 of runway 10 so that the end of each of the electrodes 354-368 is exposed at the outer surface of the block 352 whereby, as the level of water on the runway rises, and comes into contact with one or another of the exposed tips of the electrode, such electrode will become energized and an electrical signal is transmitted through the associated conductor 369 to produce an electrical signal which is processed and transmitted in the aforedescribed manner to a display. The electrodes are all embedded within a block 352 which is a hard, electrically nonconductive material such as rubber, plastic or the like and the sides 370 of the block (FIG. 12) are inclined to offer minimal resistance to aircraft wheels as they roll down the runway. The conductors 369 from the respective electrodes are insulated and are all gathered together and passed collectively through a conduit or the like 372 and are embedded within a tube 374 which lies below the surface of the runway. It should be noted from FIGS. 12 and 13 that only the tip ends of the electrodes are exposed at the outer surface of the block 352 and are flush with the inclined faces 370, being spaced graduated distances apart to correspond with the successive increments of standing water which are measured in increments of one-eighth of an inch on the display panel.

The electrodes will not be energized by only temporary wetting the surface as for example by rain or the like; the electrodes must actually be immersed in water in order to be activated. Thus, when water in the vicinity of the block 352 reaches a level to energize electrode 356, which is the lowermost readout electrode, a contact will be made to produce an electrical circuit to the diode bridge network thus causing a corresponding illumination on the display panel corresponding to one-eighth inch of water. The successively immersed electrode will register two-eighths inches and so forth. As shown in FIG. 12, the blocks 352 can either be with inclined sides or they may be of hemispherical construction, the alternate shaped blocks being indicated by reference numeral 390. In this case, the electrodes 354-368 are likewise embedded in the rubber or plastic material and the ends of the electrodes are level with the outer block surface and become energized by contact with water as the water reaches the level of the respective electrode. The electrodes are spaced calibrated distances apart and become successively energized as the water reaches the particular level. Typically, the spacing of electrodes is about one-eighth of an inch apart so that the number of electrodes energized is a direct measure of water height at the location of the block 352 or block 390.

Figure 14:
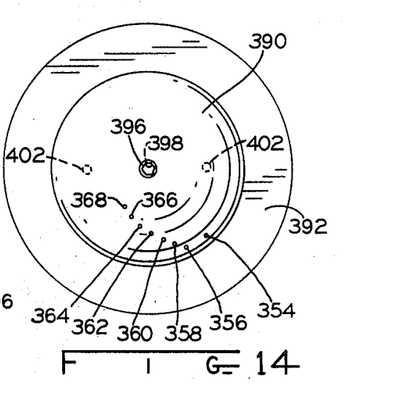
FIGS. 14 and 15 are detail views of hemispherical sensors located above the runway surface and constituting a somewhat different embodiment from that shown as frusto pyrimided in FIG. 12; and, FIG. 16 is an enlarged detail view of a second embodiment of the sensors which are adjustable and are disposed in a standing conduit of the type shown in FIGS. 3 and 4.
Figure 15:
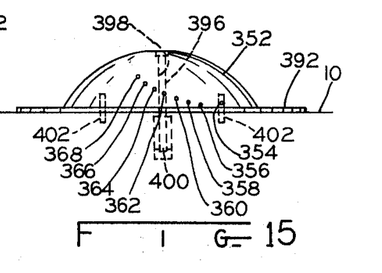

The hemispherical shape may be preferred in some installations since it offers a somewhat lower resistance to the rolling action of aircraft tires over the outer surface. The blocks 352 are mounted on a high dielectric lamination 392 which separates the blocks 352 and the embedded electrodes from the surface on the runway 10. The blocks are secured to the runway each by a fastener 396 which passes through an opening 398 of block and screws into an expander sleeve 400 which is embedded in the runway. To keep the blocks 390 from rotating each is provided with studs 402 which fit into the block 390 and into openings in the runway. In this way, the blocks 390 are prevented from rotating and will maintain their fixed position at the particular location where monitoring is to take place. Conductors from the respective electrodes (FIGS. 14, 15) are gathered into a conduit in the same manner as shown in FIG. 13, and the signals from the electrodes are transmitted to the display board in the aforedescribed manner.

Figure 16:
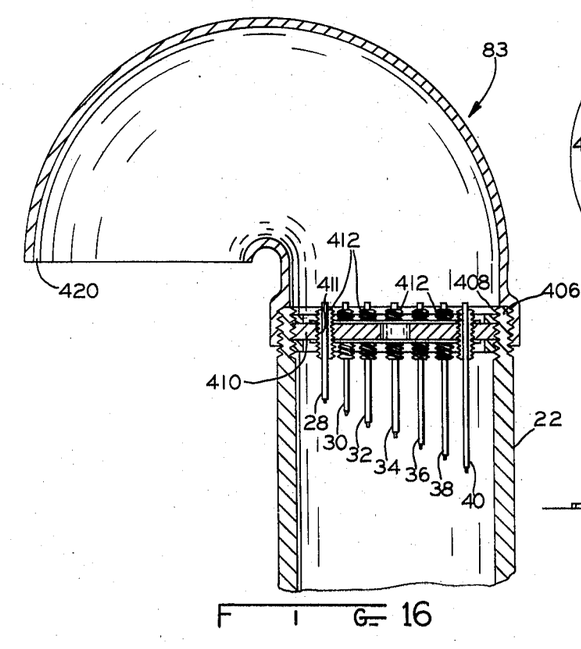

Referring next to FIG. 16, there is illustrated an alternate method whereby electrodes can be arranged in the sensors 83 indicated in FIG. 1. Instead of individually locating the sensors or probes in a helical path of conduit 22, the conduit end 406 (FIG. 16) is internally threaded as indicated by reference numeral 408 and a mounting plate 410 is threadedly received on the threads 408 and is adjustable vertically relatively to end 406. Within plate 410 there are a series of threaded openings 411 each of which receives a threaded stem 412.

The plate 410 has vent openings to permit free raising and lowering of water level within conduit 22. The electrodes 28–40 are held in the stems 412 and are adjustable relatively to each other the prescribed distance apart, so that as the water level in conduit 22 rises, the electrodes will be successively energized. It should be noted that each electrode has insulation, covering almost its entire length so that only the tips of the electrodes are responsive, hence each will emit the same signal strength when it is immersed in water. Not only can the electrodes be individually adjusted relatively to each other but the entire group of electrodes is adjustable by reason of the threaded connection between 410 with the threaded end 408 of the conduit 22. The conduit 22 is curved so that the open end 420 points downwardly to prevent inclusion of foreign material such as dirt, water and the like.

As successive electrodes are contacted by water and emit the prescribed signal, such will be transmitted to the readout device in the aforedescribed manner.

OPERATION OF THE DEVICE

In operation, as standing water collects on the runway it is measured between the sides of the runway by device 80. Water enters opening 16 and the extent of standing water above the level of the runway 10 in the vicinity of opening 16 is matched by the same level of water in conduit 22. It should be noted that the conduits 18, 20, 22 are plastic material having a high dielectric constant property. Depending on the level of water in conduit 22 one or more of the electrodes 28–44 will be immersed in water and when the electrode is immersed it will create an electrical contact which is transmitted as a signal through conductors 46–62 (FIG. 3), and causing one or more of the lights 82–96 to become illuminated and indicating in a direct readout the level of water at the location sampled. The spacing of the electrodes is in calibrated one-eighth inch increments hence the standing water is readout directly on the light panel of display 80.

Switch 85 is used to connect the readout panel with any one of a number of sensing devices, so that depending upon the selection of switch 85, information is given concerning water depth at the particular locations determined by the selector switch 85.

At the sides of the runway electrode sensors 98–112 are operative and the height of water above the runway is determined by which of the electrodes is immersed in water above the high dielectric plate 115 which is embedded in the surface of the runway at side 14. Thus, information concerning water depth is obtainable not only between the sides of the runway but at the runway sides as well.

The sampling devices are locatable either at selected locations between the sides of the runway as indicated in FIG. 8 which are predetermined to be problem areas of a runway or the entirety of the runway can be located with sensors depending upon the particular design required.

The readout for the selectively sampled runway locations is indicated in FIG. 9 or the entirety of the runway can be monitored as indicated in FIG. 10. In each instance, as indicated in FIG. 11, the sensors from the particular areas are grouped together and the signals transmitted either through the landing lights wiring 304 or a separate junction box with separate wiring from which the electrical signal is then transmitted to a control console 308 and power supply and thereafter by conductors to the display 312.

The particular electrical circuitry is as before described for FIGS. 5 and 6.

As indicated in FIGS. 12 and 13, sensing device 83 in FIG. 1 can be substituted by embedding the electrodes in suitably constructed blocks either those having inclined sides 352 (FIG. 12) or a hemispherical shape 390 as indicated also in FIG. 12. The blocks protrude above the level of the runway. The electrodes are embedded within the blocks and protrude slightly from the outer surface of the blocks so that as they become immersed in water, electrical signals are transmitted through conductors 369 and the electrical signals are transmitted to a readout device in the aforedescribed manner.

As indicated in FIG. 16, the electrode sensors are adjustable relatively to each other or as a group by mounting electrodes on individually adjustable threaded stems 412 and since all of the stems are mounted on a plate 410 which is movable adjustably at the upper threaded end 408 of the conduit 22, the electrodes can be calibrated and adjusted to provide whatever increments of standing water height is desired. In this instance, the electrodes 28–40 are all jointly mounted instead of being individually mounted in the manner indicated in FIGS. 1, 3 and 4.

By providing a display as described there is available to the ground controller accurate and continuous information concerning the location and depth of standing water on runways and such information can be readily communicated to assist in a selection of runway or portions of a runway and thereby contribute to the safety of landing and takeoff operations.

Although the present invention has been illustrated and described in connection with a few selected example embodiments it will be understood that these are illustrative of the invention and are by no means restrictive thereof. It is reasonably to be expected that those skilled in this art can make numerous revisions and adaptations and it is intended that such revisions and adaptations will be included within the scope of the following claims as equivalents of the invention.

What I claim is:

1. Apparatus for continuously sensing and monitoring standing water at remote locations on aircraft runways and the like comprising a plurality of nonelectrically conductive blocks disposed at selected locations on the runway and superimposed thereon each such block having calibrated electrode sensor means embedded at spaced vertical calibrated positions within said block and having an exposed probe means at the outer surface of the block and which is insensitive to water except in the liquid phase thereof, such electrode sensor means being selectively energized in response to the water depth at a particular height at the preselected location, electrical signalling means responsive to said electrode sensor means and electrically connected with said sensing means, and a display which is responsive to said electrical sensing means to provide a visual indication of the location and depth of standing water on the runways.

2. The apparatus in accordance with claim 1 wherein said blocks are configured with a hemispherical outer surface to provide for a rolling action of aircraft tires thereover without disturbance of the location of said block.

3. The apparatus in accordance with claim 1 wherein said electrode sensors are spaced calibrated distances apart whereby said electrodes provide direct information as to the standing water at the particular location.

4. The apparatus in accordance with claim 1 wherein said electrode sensor means provide electrical signals, of alternating current, and said display includes liquid crystal materials.

5. The apparatus in accordance with claim 1 wherein said display consists of liquid crystal elements in parallel with a microammeter.

6. The device in accordance with claim 1 including collector means disposed at the runway level and including an inlet for receiving standing water on the runway, and for developing a standing column of water equal to the depth of standing water at the same location, and a plurality of electrodes disposed at calibrated heights and responsive to the height of fluid which is standing on the runway surface.

7. The apparatus in accordance with claim 6 wherein said plurality of electrodes are disposed at the side of the runway and spaced at graduated distances from the runway surface to be responsive to water level at successive levels on said runway.

* * * * *